(12) United States Patent
Mangiardi

(10) Patent No.: US 8,080,316 B2
(45) Date of Patent: Dec. 20, 2011

(54) MULTIFUNCTIONAL AMBIENT LIGHTING COMPOSITIONS

(75) Inventor: John R. Mangiardi, Greenwich, CT (US)

(73) Assignee: Optimus Services AG, Maur (CH)

( * ) Notice: Subject to any disclaimer, the term of this patent is extended or adjusted under 35 U.S.C. 154(b) by 944 days.

(21) Appl. No.: 11/937,188

(22) Filed: Nov. 8, 2007

(65) Prior Publication Data

US 2008/0259611 A1 Oct. 23, 2008

Related U.S. Application Data

(60) Provisional application No. 60/912,818, filed on Apr. 19, 2007.

(51) Int. Cl.
*B32B 5/00* (2006.01)
(52) U.S. Cl. ............... 428/328; 428/323; 422/22
(58) Field of Classification Search ............ 422/22, 422/186.3; 428/323, 328
See application file for complete search history.

(56) References Cited

U.S. PATENT DOCUMENTS

| 4,729,068 A * | 3/1988 | Ohe ..................... 362/615 |
| 4,806,583 A | 2/1989 | Battaglia |
| 5,084,096 A | 1/1992 | Stovicek |
| 6,228,480 B1 | 5/2001 | Kimura et al. |
| 2004/0058149 A1 * | 3/2004 | Zhou et al. ............. 428/328 |
| 2008/0187457 A1 | 8/2008 | Mangiardi |

* cited by examiner

*Primary Examiner* — Sean E Conley
(74) *Attorney, Agent, or Firm* — Buckley, Maschoff & Talwalkar LLC

(57) ABSTRACT

An acrylic or other polymer composition, optionally containing aluminum trihydrate, and having undoped and/or doped titanium dioxide dispersed evenly throughout is disclosed. Said composition provides a sterile surface which can be renewed. Said composition provides a highly sterile surface upon photoactivation of the surface by at least either low-level ultraviolet irradiation or ambient/natural light (as when using doped titanium dioxide). A method of using such a surface material is also disclosed. Said acrylic or other polymer composition may be adhered onto a polycarbonate or other polymeric backing, optionally by an intervening layer of a third polymer. The resulting acrylic or other polymer/polycarbonate or other polymer combination is adapted to provide ambient lighting when exposed to a light source.

10 Claims, 3 Drawing Sheets

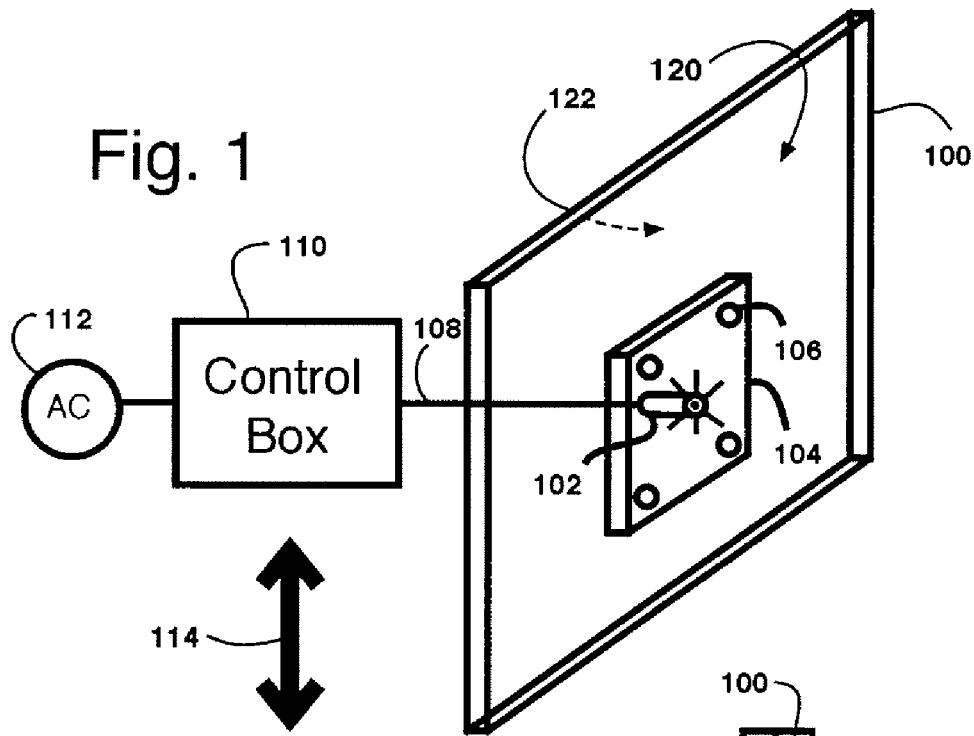
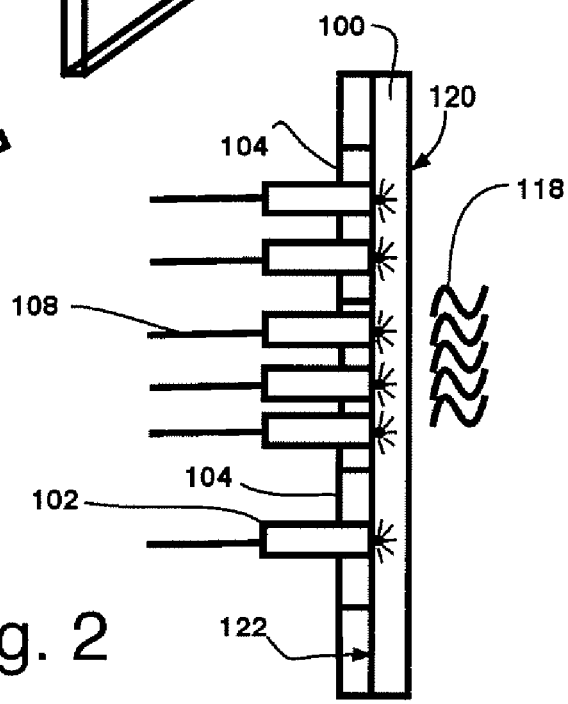

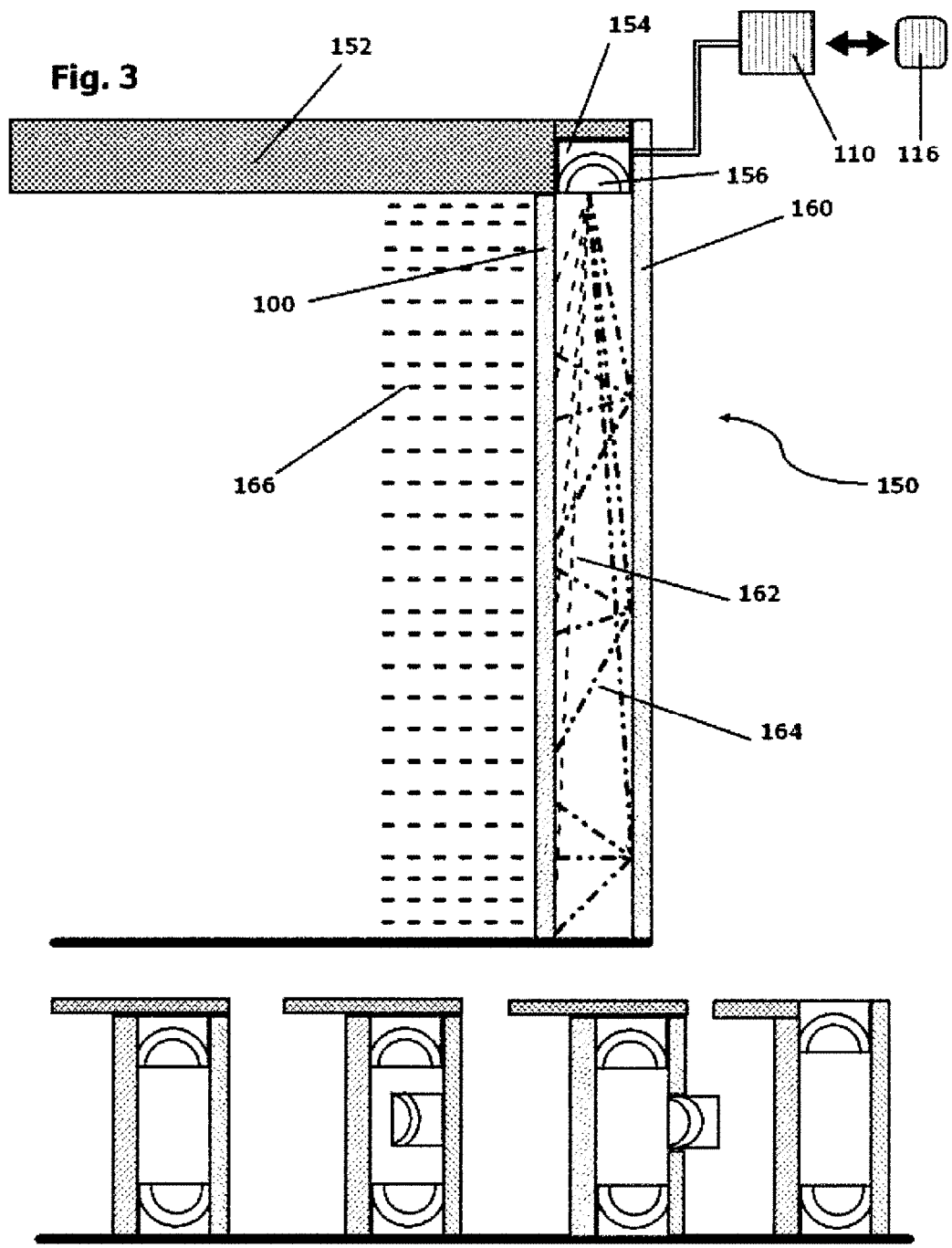

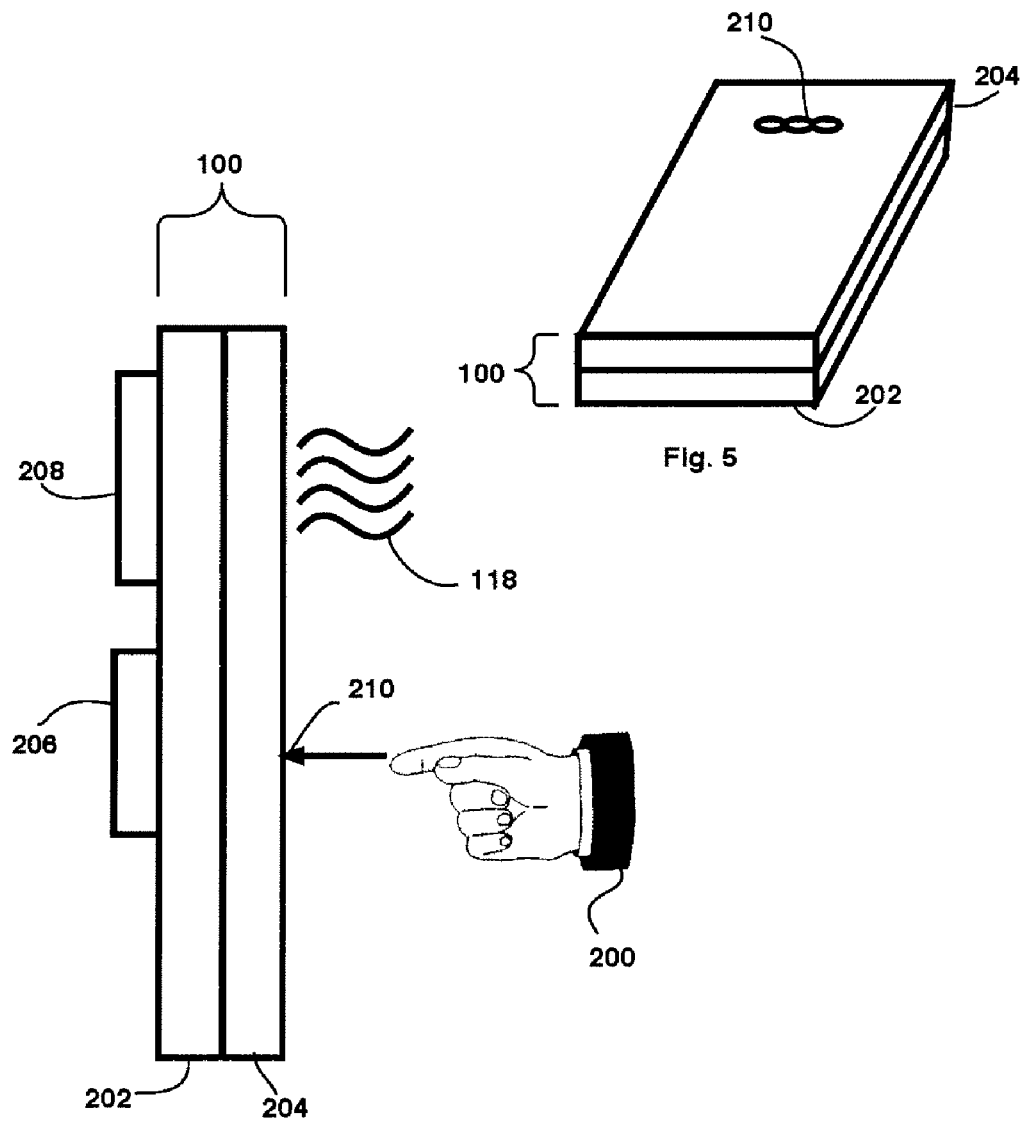

MULTIFUNCTIONAL AMBIENT LIGHTING COMPOSITIONS

CROSS-REFERENCE TO RELATED APPLICATIONS

This application claims the benefit of the provisional application entitled "MULTIFUNCTIONAL AMBIENT LIGHTING COMPOSITIONS" to Dr. John Mangiardi, filed 19 Apr. 2007, as U.S. Ser. No. 60/912,818 and the complete content of this application is incorporated by reference.

BACKGROUND OF THE INVENTION

1. Field of Invention

The present invention relates to multi-functional compositions adapted to provide ambient lighting, germicidal properties, and/or electrical conductivity.

2. Background of the Invention

Low cost, easily formable compositions that are adapted to provide sterile, renewable surfaces while also capable of transmitting diffuse, ambient high-quality light would be of great benefit. The current invention discloses in part such compositions and methods of their use. Such compositions are useful in multiple environments, including hospital rooms.

For example, it is well known that a typical hospital patient's experience in an operating room is a frightening experience, often worsened by the garish and harshly lighted environment. In addition to disquieting the hospital patient, sedation rates are impacted by the nature of the room environment. As a result, an invention that improves the mood and sense of calm of a patient would be of benefit. While hospitals have begun to utilize some forms of ambient lighting in various hospital environments such as in diagnostic rooms or in routine procedure rooms such as catheterization labs, there is no adequate system for providing ambient lighting to a hospital surgical room environment. In part, such compositions must be adapted for the particularly rigid sterility requirements of a hospital operating room. Prior art lighting systems provide minimal lighting, i.e. an ambient light source in one small position on a wall or ceiling, and therefore do not create an immersive lighting environment. Also, the ambient lighting is provided by focusing a colored light source onto the front of a wall, typically resulting in a washed-out light. The presence of these lights in the operating room environment is conceivably a safety hazard, as they are difficult to clean (if they are cleaned at all) and provide additional surface area exposed to biohazards (thereby providing a medium for their growth). As such, a successful ambient lighting system would have to incorporate a composition adapted for the particular requirements of an operating room environment, namely, sterility requirements and fire, water, and electrical safety requirements. Such a composition is also further suitable for non-hospital environments such as personal or commercial residences.

Titanium dioxide is a naturally occurring form of oxidized titanium and has found many industrial applications. It is cheap, widely available, and has been recognized by the U.S. Food and Drug Administration as harmless to humans. It is most commonly recognized as a white pigment in paints or cosmetics. Less well known are its photocatalytic properties. When added to coating materials such as paint or when placed on surfaces such as windows, it breaks down organic compounds and acts as both a sterilizer and deodorizer. This activity is greatly enhanced by exposure to ultraviolet radiation.

Acrylic polymers containing aluminum trihydrate are surface materials, which have demonstrated useful properties. Typically, such compounds are inert, nontoxic and hypoallergenic. Additionally, such compounds are non-porous and because they do not absorb materials, will limit bacterial or fungicidal growth. Polymers such as this may also be transparent. Polycarbonates are a group of thermoplastic polyesters that are easily molded and thermoformed.

It is an object of this invention to provide a composition adapted to supply a diffuse ambient light wherein its intensity, color, and on/off state are controlled wirelessly by a surgeon or other person.

It is an object of this invention to provide a composition adapted to provide an immersive lighting experience.

It is a further objective of this invention to provide a composition adapted to allow sensitivity to conductivity changes.

It is yet another object of this invention to provide a composition adapted to allow current to pass from one surface of the composition to a distal surface sufficient to allow a detector to sense an operator's touch on a surface.

It is an objective of this invention to provide a composition which allows light to pass from one surface to another while providing that transferred light is evenly diffused, is not spotted, and is evenly mixed with other light sources directed at the surface.

One or more of the above objects is met in whole or in part by this invention, and further objects may be realized by consideration of the description and claims below. The scope and applicability of such a composition as adapted are readily apparent to those skilled in the art and are not limited to the specific embodiments described or environments such a composition is described as being used in.

SUMMARY OF THE INVENTION

In one or more embodiments of the present invention, a multifunctional (ambient lighting) composition is described comprising: a first polymer optionally having dispersed within an amount of titanium dioxide, said amount adapted to result in the surface of said polymer becoming at least 99% sterile upon exposure of said polymer to ultraviolet irradiation; and a material comprised of a second polymer, such as, in one preferred embodiment, polycarbonate adhered onto said first polymer, said second polymer adapted to allow diffuse transfer of a light source. Also disclosed is a method of using the above composition, wherein a) said composition is placed as a surface material in environments demanding high sterility; b) said composition is periodically irradiated with ultraviolet light to ensure sterility; and c) said composition is resurfaced when the surface of said composition is damaged. The composition may also be used to provide a sterilizable ambient lighting system, wherein said composition is adapted to provide a diffuse ambient light when light is presented to a surface of said composition; and at least one light source is adapted to provide light presented to a surface of said composition; and a control box is adapted to provide power to said light and further adapted to select among light sources and adjust the color, intensity, and on/off state of any light-source. Further, the composition can be used in a method of providing an ambient light in a room using sterilizable materials, comprising providing the above ambient lighting system; integrating said composition into or onto at least one wall or ceiling of a room; integrating a) panels containing colored LEDs onto; or b) colored light-sources near a surface of said composition; and selecting a desired color and intensity on said control box and powering at least one said light directed onto said surface of said composition, thereby providing a diffuse ambient light. Lastly, the present invention also comprises an alternative embodiment of the composition in which the composition is a solid surface material comprising a polymeric composition having dispersed throughout $TiO_2$ and/or doped $TiO_2$ in an amount adapted to result in the surface of said solid surface material becoming at least 99% sterile upon exposure to at least one of the following: ambient, natural, or ultraviolet light conditions. The material may be doped with boron, carbon, and/or nitrogen.

This invention comprises, in one embodiment, the synergistic coupling of two compositions to provide a new composition that is adjoined with yet another composition to provide a multifunctional composition with greatly improved qualities. Titanium dioxide, alone, or dispersed on a surface, is not a useful composition for antibacterial activities because over time the dispersion is dissipated through normal wear and tear. As such, the useful half-life of titanium dioxide is low. Acrylic polymers are useful but like any solid material composition can harbor bacteria or other contaminants. While relatively less conducive to bacterial growth, acrylic polymers alone are insufficient for environments where a high sterility is demanded. For example, hospital operating rooms or home or restaurant kitchens demand higher sterility. While a dispersion of titanium dioxide on such a surface might provide antibacterial properties, the effective half-life of such a combination is low. As the surface becomes damaged or scratched, lacunae in the surface develop which can harbor bacteria. Owing to the general property that acrylics can be sanded or resurfaced, this invention comprises an acrylic composition that contains titanium dioxide evenly dispersed throughout. This invention further discloses that photoactivation of the composition by irradiation with ultraviolet light greatly enhances the sterilizing properties of the composition. As such, a high sterility environment can be maintained by periodic irradiation of the environment. Further, unlike other compositions that have a variety of antibacterial compounds dispersed throughout the composition, titanium dioxide is environmentally safe. Therefore, harm to the environment or personnel is minimized, especially during sanding during which time fine particulates are created. In environments where high-sterility is not required, for example, a restaurant bar table top, a show-room floor, or general purpose walls, the titanium dioxide can be omitted.

The combined titanium dioxide/acrylic (or other) polymer combination or the acrylic (or other) polymer material alone may be adapted to allow optimal light diffusion by combination with a second polymer backing such as, but not limited to, a polycarbonate backing. In a highly preferred embodiment of this invention, the composition is a combination of an acrylic polymer with a polycarbonate backing. It has been found that the acylic/polycarbonate combination provides ideal and sufficient ambient lighting characteristics for use in the environments described throughout this disclosure. The polycarbonate backing works synergistically with the acrylic combination to diffuse light, allow mixing of multiple colored light sources, and may be further adapted to allow electrical conductivity such that any surface can detect an operator's touch. In other preferred embodiments, the acrylic/polycarbonate contains titanium dioxide or a derivative in the acrylic portion. Finally, preferred embodiments also include other first polymer/second polymer combinations, with or without titanium dioxide or derivatives in the first polymer, i.e. the surface exposed polymer. Other first polymers should have minimal porosity, may be thermoformable (meaning their shapes can be set under thermal conditions), and be resurfaceable. Other second polymers should allow the diffuse transfer of light with polymers providing even diffusion of light and minimal light loss preferred.

Returning to the preferred embodiments, by providing the described polycarbonate/acrylic combination (or equivalent alternatives), a back-panel containing a focused light source such as a colored LED or an alcove containing an array of bright-colored lights may be used to provide—in combination—an ambient light source. Particularly, the translucent sheet provides an ambient light source when the non-exposed surface, i.e. the surface joined with the back-panel or open to presentation from light from an alcove containing an array of bright-colored lights, is presented with a focused light source. The walls of an operating (or other) room can then be fashioned out of this translucent sheet panel allowing the room to be lit from all sides in varying intensities. Since the color of the back lighting can be changed, it produces a mood-enhancing environment that can lessen the anxiety level of a patient and provide a comfortable working environment for surgeons and staff. Lastly, by utilizing wireless communication devices, such as Bluetooth enabled PDAs, the LED panels or bright-colored light arrays can be controlled by integrating with them a control box containing a microprocessor adapted to control the lighting intensity, color selection, and on/off state of the LED panels. Control need not be by wireless communication.

BRIEF DESCRIPTION OF THE DRAWINGS

The present invention can best be understood in connection with the accompanying drawings. It is noted that the invention is not limited to the precise embodiments shown in drawings, in which:

FIG. 1 is a perspective view of one embodiment with an integrated schematic overview of the wirelessly controlled ambient lighting system.

FIG. 2 is a side view of the ambient lighting system embodiment described in FIG. 1.

FIG. 3 is an alternative, preferred embodiment shown in side-view.

FIG. 4 is a side view of the combination composition.

FIG. 5 is a perspective view of the combination composition.

BRIEF DESCRIPTION OF REFERENCE NUMERALS

100 translucent wall material slab (polycarbonate/acrylic polymer combination); 102 lit LED; 104 LED panel; 106 LED; 108 power cord to/from LED to/from control box; 110 control box; 112 power; 114 wireless I/O; 116 wireless control; 118 diffuse ambient light; 120 exposed translucent panel surface; 122 non-exposed translucent panel surface; 150 alternative ambient lighting system; 152 ceiling; 154 light housing; 156 light or light array; 160 wall; 162 non-reflected light beam; 164 reflected light beam; 166 ambient light; 200 operator hand; 202 polycarbonate backing; 204 acrylic polymer; 206 conductivity sensor; 208 LED panel; 210 touch point.

DETAILED DESCRIPTION OF THE INVENTION

In a preferred embodiment in which titanium dioxide is added to the outer polymer, titanium dioxide, preferably in the anatase form, is added to a composition of acrylic polymer (or other polymer composition) containing aluminum trihydrate in an amount effective to ensure complete sterility of the surface when exposed to, at least, low level ultraviolet radiation for an effective time. In a preferred and exemplary embodiment, the titanium dioxide is added to provide a composition containing from 0.1 to 1% titanium dioxide in the anatase form by volume. In another embodiment, the titanium dioxide may be present up to about 1% titanium dioxide but not greater than 1.1%. While these ranges are preferred, other concentration amounts may also be used provided that the concentration is not so great as to cause flaking of the material or clouding of the surface. Concentrations below 1.1% meet this requirement but greater concentration levels are contemplated. Further, in applications where clouding and/or flaking are not a concern, higher concentrations may be added to optimize the sterility feature of the invention.

The titanium dioxide as dispersed is thereby also effective to maintain sterility after an initial first sterilization for a reasonable period of time before a second or repeated sterilization is initialized, such as prior to an event requiring high sterility. The acrylic or other polymer composition containing titanium dioxide can be placed as a surface material such as in a hospital room. Owing to the unique properties of acrylic polymers containing aluminum trihydrate, the surface material can be molded and set such that seams or crevices are obviated. Other polymers having such molding attributes are also preferred. Thus, a method of providing a sterile working environment is achieved. The room's major surfaces are comprised of this improved composition and periodically irradiated to maintain high sterility. High sterility is defined as a surface being at least 99% free of bacteria or fungi as determined by, for example, a culture test.

In an alternative embodiment, the composition remains substantially the same but nitrogen (or carbon or boron) doped $TiO_2$ is used instead. Nitrogen doped $TiO_2$ is preferred. The addition of nitrogen allows the anatase form of $TiO_2$ to become photocatalytically active in normal or ambient light, i.e. UV light is not required to activate sterilization. Such doped titanium compounds are described by Chang, et al. in Applied and Environmental Microbiology, September/2006, p 6111-6116 and by Han, et al. in the Journal of Zhejiang University SCIENCE B, 2005 7(4):299-303, both of which are hereby incorporated by reference. Dispersion of such materials throughout a composition, e.g. an acrylic or other polymer, would provide a solid surface material of profound benefits.

Continuing, as the surface of the improved composition is damaged or scratched, the solid surface material can be sanded, polished, or otherwise renewed by removal of a portion of the outer layer to provide a fresh, uniform surface with renewed antibacterial and other properties. Such resurfacing could be done on a periodic basis to ensure that high sterility is maintained. For example, the composition could be sanded once a month, once a year, or at other periodic intervals.

In an alternative embodiment of the present invention, a surface material that is non-translucent is provided. Such a material retains the sterility properties of the main embodiments of the invention because $TiO_2$ is dispersed throughout. Such a material can be used in alternate settings, such as school desktops, shower stalls, flooring, sinks, walls, and other surfaces where translucence to light is not required but sterility is. In either the main or alternative embodiments, the materials can be used in healthcare environments, homes, schools, restaurants, hotels, and other commercial, residential, and industrial facilities. The dispersion of $TiO_2$ can also be in a substance, which will harden into a solid surface such as a lacquer or unhardened acrylic. In such a case, the material can be poured, such as on a floor, allowed to harden, and thereby provide a thick, sterile coat. Such a coat can be translucent or colored by the addition of pigments and is layered or poured in sufficient volume that the hardened surface can be renewed at least one or more times by sanding, polishing, or other resurfacing methods. It is also contemplated that cognate forms of titanium dioxide including other oxides displaying similar sterilization properties under irradiation may be used provided such oxides are generally non-toxic.

It should be noted that in all instances where sterilization occurs, the materials and compositions of the present invention are adapted—by dispersion of an effective amount of photocatalyst, e.g. titanium dioxide or doped titanium dioxide—to provide a sterile surface under ultraviolet irradiation in under a day under normal ambient temperature and preferably under a day with only ambient, natural light under normal ambient temperatures and in at most under a week under the same conditions. Provided a direct light source (UV or otherwise) the sterilization may occur much faster. Tests have determined that surface materials made in accordance with at least one or more of the embodiments of the present invention, are sterilizable in as little as an hour under appropriate lighting conditions. Stronger wattage light sources provide faster sterilization times. Certain wavelengths of light perform better and can be determined by routine experimentation. Direct lighting, as opposed to lighting of a surface at an oblique angle, provides optimal sterilization times. Greater concentrations of titanium dioxide improve sterilization times but it is a teaching of the present invention that concentrations above 1.1% are to be avoided in certain applications, particularly when the transparency and integrity of the material is vital. Finally, references to the surface of the surface material are to be construed as indicating the exposed surface of the material, e.g. sterilization of the surface of the surface material indicates that at least the exposed surface of the surface material is sterilized. While any portion of the surface may be sterilized, only the exposed surface of the material will usually receive adequate light exposure. The exposed surface is also the most critical area for sterilization.

In an exemplary embodiment of the ambient lighting composition, the ambient lighting composition is made by adhering to the acrylic polymer (or other polymeric mixture)/titanium dioxide composition a backing of polycarbonate. Note, titanium dioxide is optional, and may be omitted when sterility is not required. Further, other polymers for the surface material and the backing may be used as described earlier. The thickness of the first acrylic composition and the thickness of the polycarbonate material may be adjusted to provide maximal diffusion and optical transfer characteristics depending on the requirements of the environment.

In an alternative embodiment, the first polymer, such as an acrylic (optionally containing titanium dioxide), and a second polymer, such as a polycarbonate, may be joined by an intervening layer. Such a layer may comprise a third polymer or an adhesive. In a preferred embodiment, the intervening layer comprises a material which upon stimulation, such as by heating, irradiation, or otherwise, interposes itself into the first and second polymers to such a degree that the first and second polymers are rigidly joined. In an alternative embodiment, the intervening layer may be a material which affixes the first and second layer by chemical reaction over time, e.g. an adhesive or glue which sets over time but without additional stimulus. The presence of a third layer provides a means for 1) adhering the layers; 2) adjusting the ambient diffusion properties of the composition; and 3) providing specialized insulation, e.g. electromagnetic insulation such as with a polymer containing lead dispersed throughout. For example, the intervening layer may have a refractive index that changes or is dis-uniform over the area of its disposal, thereby providing light effects, such as dis-uniformly orientated light. Alternatively, the layer may simply provide a substantial bond between the layers that does not interfere with light transmission.

The polycarbonate or other second polymer material may be etched on the non-adhering surface to provide a display (such as the outline of a button or other pictograph) that is visible on the exposed acrylic surface. As such, the exposed acrylic surface remains smooth with no openings but a touch point for a button or switch may be easily identified. As diffuse light passes through the material, an etched polycarbonate backing will provide a shadow of the etch on the surface thereby revealing the touch point. Some of the embodiments of the invention may be referred to as an AMBI-WALL system, since the compositions can be utilized to construct ambient wall lighting systems, as described in some of the following embodiments.

FIGS. 1-2 describe an embodiment of the invention.

FIG. 1 is a perspective view with an integrated schematic overview of the wirelessly controlled ambient lighting system. The surgeon utilizes a PDA or other wireless device 116 to communicate with a wireless-enabled control box 110. The control box may also be activated directly by a wired control unit incorporated into the composition. The control box is powered by an electrical source 112. The control box adjusts the intensity and on/off state of an LED 102. An LED capable of a single colored light or an LED capable of multiple color emissions may be used. If a single colored LED is used, multiple LEDs of various colors may be placed on the panel as shown by the four additional unlit LEDs 106. Any number of LEDs or placement of LEDs on the panels may be used as appropriate. When the LEDs are powered, focused light reaches the non-exposed—i.e. the side substantially not visible to persons in the room—surface 122 of the translucent sheet 100, which is joined with the backlight panel 104. As a result, focused light is scattered to produce a diffuse and pleasing light on the exposed surface 120.

FIG. 2 is a side view of the backlight panel 104 and translucent sheet 100 combination. Multiple lit LEDs 102 are shown producing a diffuse light 118. The backlight panels 104 are stacked next to each other and joined with the translucent sheet 100. As can be seen in the drawing, any number of LEDs may be in any one backlight panel 104. The non-exposed 122 and exposed 120 surfaces are more clearly seen in this side view drawing.

FIG. 3 shows an alternative embodiment of the invention.

FIG. 3 shows an alternative means for backlighting the translucent sheet 100 with exposed surface 120 and non-exposed surface 122. Sheet 100 may extend from the ceiling 152 to the floor. Behind sheet 100, light housing and light array 156 is placed in an alcove 154 in the ceiling 152. The alcove 154 and the light 156 may be disposed also or alternatively in the floor or in a recessed notch in wall 160. Wall 160 may optionally comprise a reflective surface, such as a mirror or polished steel. Light 156 may be an array of bright, colored halogen lights. It may also be an array of solid-state LED lighting. For example, an array of Luxeon® brand lights (from Philips®) or the Destiny CV® projection light (from TIR®) may be used. In other words, light sources that can alone or in combination with other light sources provide a bright colored light—preferably color-selectable—are acceptable.

As light from 156 reaches the non-exposed surface of 122 of panel 100, either directly (162) or by reflection (164, aided when 160 is reflective such as by a shiny, reflective surface) the exposed surface 120 produces light. The surgeon or operator can also, as in the previous embodiment, utilize a PDA or other wireless device 116 to communicate with a wireless-enabled control box 110.

In general, the translucent sheet and backlight panel or light array combination can be placed on any wall or ceiling area in an operating room or other room. Preferably, a majority of the surfaces of the operating room are paneled with the translucent sheet. If backlight panels are used, they may be large or small and have a variable density of LEDs or other focused light sources. In one embodiment, the panels are 6 inches by 6 inches square with a depth of between 0.25 and 0.75 inches and contain 5 LEDs spaced equidistant from each other. If colored lights or colored light arrays are used, a number of dispositions of the light array are contemplated. Some of these dispositions are shown at the bottom of FIG. 3 in the four schematic representations.

FIG. 4 shows an embodiment of the composition material. Acrylic polymer 204 is adhered to the polycarbonate backing 202. Circuitry 206 is positioned and adapted to detect conductivity changes in the material such that when an operator hand 200 touches point 210 a signal is produced which can then effect control changes, e.g. a light may be switched on or off. LED panel 208 produces ambient light 118. Alternatively, composition 100 may be lit by other backlighting directed to the composition. Again, the first and second polymers need not be acrylic and polycarbonate and there may be an intervening layer between them (not shown).

FIG. 5 shows a perspective view of the composition. Touch points 210 are visualized by the shadow they produce when the backsurface of 202 is etched and illuminated. Alternatively, specially colored lights may be placed under touch points 210 to distinguish these points.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention. It is further known that other modifications may be made to the present invention, without departing the scope of the invention, as noted in the appended claims.

I claim:

1. A light-sterilizable, translucent panel for use in the ambient light source, comprising:
    a translucent acrylic sheet; and
    a translucent polycarbonate sheet bonded to said translucent acrylic sheet;
    wherein the translucent acrylic sheet comprises about 0.1 to 1.1% (v/v) titanium dioxide or doped titanium dioxide uniformly dispersed therein.

2. The light-sterilizable, translucent panel of claim 1, wherein said translucent polycarbonate sheet is directly bonded to said translucent acrylic sheet.

3. The light-sterilizable, translucent panel of claim 1, wherein said polycarbonate sheet is bonded to said acrylic sheet by an intervening layer.

4. The light-sterilizable, translucent panel of any one of claims 1, 2 or 3, wherein the acrylic sheet further comprises aluminum trihydrate uniformly dispersed therein.

5. The light-sterilizable, translucent panel of any one of claims 1, 2 or 3, wherein the acrylic sheet further comprises titanium dioxide doped with boron, carbon, and/or nitrogen.

6. The light-sterilizable, translucent panel of any one of claims 1, 2 or 3, wherein the acrylic sheet comprises an amount of titanium dioxide sufficient to permit at least an air-exposed surface of said sheet to be rendered 99% sterile upon exposure to ambient or ultraviolet light.

7. A multifunctional, ambient lighting system for a room, comprising at least one ambient light source, each ambient light source comprising:
- (i) a light-sterilizable, translucent panel comprising a translucent acrylic sheet, wherein the translucent acrylic sheet comprises about 0.1 to 1.1% (v/v) titanium dioxide or doped titanium dioxide uniformly dispersed therein, and wherein the acrylic sheet of said light-sterilizable, translucent panel comprises:
  - a first surface, the first surface positioned proximal to and exposed to the room;
  - an interior;
  - a second surface substantially parallel to the first surface, the second surface positioned distal to and not exposed to the room;
- (ii) a reflector, wherein the reflector is positioned further distal to the room than the light-sterilizable, translucent panel and in optical juxtaposition to the light-sterilizable, translucent panel; and
- (iii) a light source, which is optionally colored, wherein the light source is positioned so as to be capable of directly illuminating the non-exposed surface of the light-sterilizable, translucent panel and indirectly illuminating the non-exposed surface of the light-sterilizable, translucent panel by reflection off the reflector;

wherein the interior and the exposed surface of the light-sterilizable, translucent panel provide a diffuse ambient light to the room when the lighting source directly and indirectly illuminates the non-exposed surface of the light-sterilizable, translucent panel.

8. The multifunctional, ambient lighting system of claim 7, in which said light source is a focused colored light, an array of colored lights, an array of colored, focused lights, or an array of unfocused, colored lights.

9. The multifunctional, ambient lighting system of claim 7, in which said light source is an array of back-panels joined to the light-sterilizable, translucent panel.

10. The multifunctional, ambient lighting system of claim 7, wherein said multifunctional, ambient lightin system is controlled wirelessly.

* * * * *